May 22, 1945.  J. W. MORAN  2,376,712
BATTERY SEAL
Filed Sept. 29, 1943

INVENTOR.
JOHN W. MORAN.

Patented May 22, 1945

2,376,712

UNITED STATES PATENT OFFICE 2,376,712

BATTERY SEAL

John W. Moran, Cleveland, Ohio, assignor to The Radiart Corporation, Cleveland, Ohio, a corporation of Ohio Application September 29, 1943, Serial No. 504,208

1 Claim. (Cl. 251—119)

This invention relates, as indicated, to battery seals, but has reference more particularly to a combined seal and vent for batteries, which, at times, are subjected to immersion in salt water and the like.

In the use of batteries on motor vehicles, such as vehicles designed to be diven off landing barges and the like, such batteries are frequently subjected to immersion in or splashing by salt water, which tends to corrode or otherwise injure the batteries.

The present invention has as its primary object the provision of a seal which is adapted for use in connection with such batteries and which is effective to prevent ingress of salt water and the like into the battery, irrespective of the position of the battery.

Another object of the invention is to provide a seal of the character described, which while effective to prevent ingress of salt water and the like, is also effective to permit venting of evolved gases from the battery, irrespective of the position of the battery.

A further object of the invention is to provide a combined seal and gas vent of the character described, which is made from acid-proof, corrosion-resisting materials, which is of simple design and rugged construction, and which is not likely to get out of order, even under the most difficult conditions under which the battery may be used.

Other objects and advantages of the invention will be apparent during the course of the following description.

In the accompanying drawing, forming a part of this specification, and in which like numerals are employed to designate like parts throughout the same.

Figure 1:
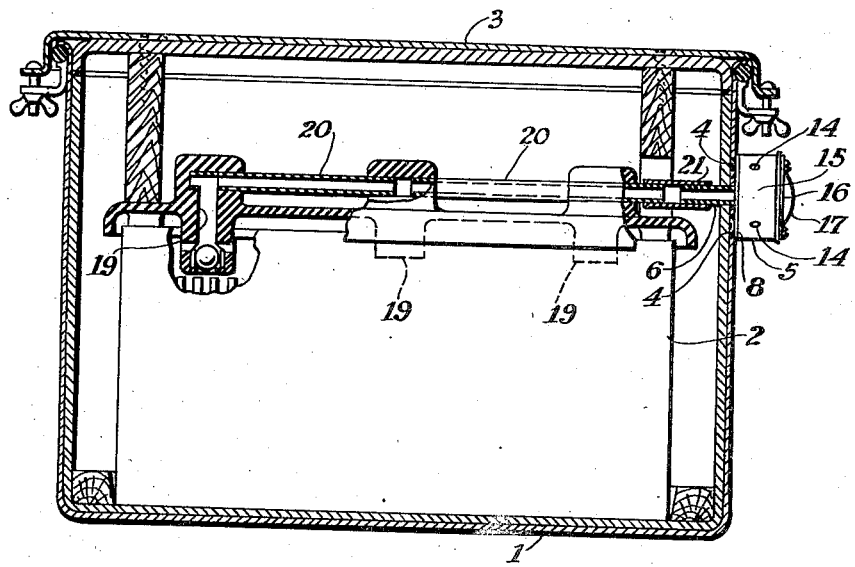
Fig. 1 is a cross-sectional view through a conventional battery having associated therewith the novel seal and vent of the present invention.
Figure 3:
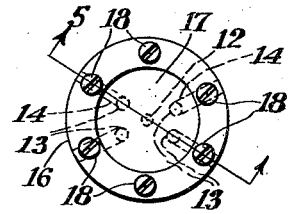
Fig. 3 is a top plan view of the water seal and gas vent.
Figure 2:
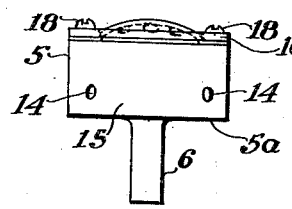
Fig. 2 is a side elevation of the water seal and gas vent.
Figure 5:
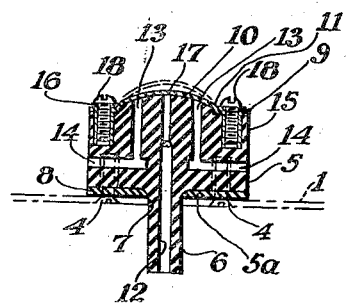
Fig. 5 is a cross-sectional view, taken on the line 5—5 of Fig. 3.
Figure 4:
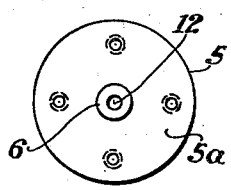
Fig. 4 is a bottom plan view of the water seal and gas vent.

Referring more particularly to the drawing, there is shown a metallic container or box 1, in which a battery 2 is disposed, the container 1 being sealed against access of water thereinto by means of a cover 3, which is suitably fastened to the container.

Secured to one end of the box 1, as by means of screws 4 is a circular valve body 5, preferably formed of an acid-resistant plastic, such as Bakelite, and having a stem portion 6 of reduced diameter formed integrally therewith and which extends through an opening 7 in the box end. A gasket 8 of water-proof material is interposed between the box end and the base 5a of the valve body.

The outer face of the valve body 5 consists of an annular surface 9 which is concentric with the axis of the valve body and is disposed in a plane parallel with the base 5a thereof, and a spherical central portion 10, the periphery of which is spaced a slight distance from the annular surface 9.

The valve body further includes an axial passageway 12, which extends entirely through the valve body, and a series of circumferentially-spaced passageways 13, which extend through the valve body in parallel relationship to the passageway 12, these passageways intersecting an equal number of passageways 14 which extend radially to the peripheral surface 15 of the valve body.

The valve further includes an annular metallic washer 16 having a disk-like diaphragm 17 of rubber adhesively secured to one surface of the washer, the washer being secured as by means of screws 18 to the annular surface 9 of the valve body, with the diaphragm interposed between the washer and said surface, the central portion of the diaphragm being distended sufficiently to entirely cover the spherical surface 10.

The diaphragm 17 is preferably made of a disc of synthetic rubber, which is resistant to battery acids and acid fumes, as well as to salt water, and its thickness may vary from .010" to .025".

The conventional battery for which the valve of the present invention is especially adapted is provided with a series of vents 19 for gases evolved during the active life of the battery, these vents being connected to a conduit 20, which, by means of a tube 21, is connected to the stem portion 6 of the valve body 5.

In operation, the rubber diaphragm acts as a seal to prevent ingress of salt water into the battery by way of the axial passageway 12, the tension on the diaphragm 17 being sufficient to overcome any tendency for such water to enter the passageway 12 by way of the passageways 14 and 13. The seal against ingress of water is further assisted by virtue of the fact that the pressure due to air or water through passageways 14 and 18 on the underside of the diaphragm will be equalized by the pressure of such air or water on the exterior surface of the diaphragm. In other words, under all normal conditions of usage of the battery, the battery will be sealed against the ingress of salt water, air, and other fluids which are likely to injure or damage the battery.

When, however, the evolved gases in the battery attain a predetermined pressure, such pressure will act to overcome the tension of the diaphragm 17 sufficiently to permit the gases to escape to the atmosphere or other medium surrounding the box 1 by way of the axial passageway 12, the space between the spherical surface 10 of the valve body and the undersurface of the diaphragm, and the passageways 13 and 14. The pressure of the escaping gases is, moreover, sufficient to overcome any tendency of the water to enter the battery during the time the gases thus escape.

The device which has been described constitutes, in other words, a combined water seal and gas vent, and as such, is believed to be unique and novel in character, being effective not only to prevent ingress of salt water and the like into the battery, but effective also to permit venting of evolved gases from the battery.

It will be noted moreover, that the device is operative irrespective of the position which the battery occupies.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In a combined water seal and gas vent for batteries, a valve body having a spherical surface portion at one end surrounded by a flat, annular surface disposed in a plane perpendicular to the axis of the valve body, a rubber diaphragm having an imperforate distended portion disposed over and in contact with said spherical surface and having its margin resting on said annular surface, an annular gasket seated on the marginal portion of the diaphragm and surrounding the spherical surface and means for fastening the gasket to said annular surface, the valve body having an axial duct extending through the body to the spherical surface and having circumferentially spaced passageways extending from said surface through the body parallel with and spaced from said axial duct and terminating in lateral ducts extending through the side walls of the body, said diaphragm projecting through the gasket so as to have its outer surface exposed to external pressure to assist in seating the diaphragm on the spherical surface to normally close the axial duct and passageways regardless of the position of said valve body.

JOHN W. MORAN.